United States Patent [19]

Sung

[11] Patent Number: 5,682,300
[45] Date of Patent: Oct. 28, 1997

[54] GROUNDING APPARATUS FOR A CATHODE RAY TUBE

[75] Inventor: Ki-Hyub Sung, Suwon-si, Rep. of Korea

[73] Assignee: SamSung Electronics Co., Ltd., Suwon, Rep. of Korea

[21] Appl. No.: 674,845

[22] Filed: Jul. 3, 1996

[30] Foreign Application Priority Data

Jul. 3, 1995 [KR] Rep. of Korea ............. 16182/1995
Jun. 17, 1996 [KR] Rep. of Korea ............. 16101/1996

[51] Int. Cl.⁶ .................................................... H05K 9/00
[52] U.S. Cl. .................. 361/817; 361/682; 361/825; 312/7.2
[58] Field of Search ........................ 361/817, 800, 361/802, 815, 816, 818, 825, 829, 682, 683, 681; 174/35 R, 35 MS; 312/7.2; 248/917, 918; 220/2.3 A, 2.1 A; 455/347, 348

[56] References Cited

U.S. PATENT DOCUMENTS

| | | |
|---|---|---|
| 3,890,526 | 6/1975 | Palac ............................. 313/408 |
| 3,896,321 | 7/1975 | Sedivy ........................... 313/404 |
| 3,943,399 | 3/1976 | Sedivy ........................... 313/404 |
| 4,644,408 | 2/1987 | Coleman ........................ 312/7.2 |
| 4,853,790 | 8/1989 | Dickie ........................... 358/245 |

*Primary Examiner*—Leo P. Picard
*Assistant Examiner*—Anthony Dinkins
*Attorney, Agent, or Firm*—Robert E. Bushnell, Esq.

[57] ABSTRACT

A grounding apparatus for electrically grounding a high voltage for use with a video monitor includes a from case section having an opening, a cathode ray tube having a plurality of cathode ray tube cars protrudently extended from a metallic band extending around the periphery thereof, for firm engagement with the front case section by first screw and having grounding wire linking and suspending on the cathode ray tube ears, a guide bracket fixedly assembled to the front case section to secure a contact with the cathode ray tube ear, a mold frame fixed to and supported by the mold frame and a shield plate having a conduction arm for establishing an electrical conduction path of the high voltage to ground potential. The grounding apparatus provides a more safe video monitor by securing an electrical connection between a high voltage induced at a cathode ray tube and ground potential.

10 Claims, 5 Drawing Sheets

GROUNDING APPARATUS FOR A CATHODE RAY TUBE

CROSS-REFERENCE TO RELATED APPLICATIONS

This application makes reference to, incorporates the same herein, and claims all benefits accruing under 35 U.S.C. §119 from Korean Utility Model Application for Grounding Assembly for A Shield Case and A Cathode Ray Tube earlier filed in the Korean Industrial Property Office on the 3rd of Jul. 1995 and for a Grounding Apparatus for A Cathode Ray Tube fried in the Korean Industrial Property Office on the 17th of Jun. 1996, and there duly assigned respective Serial Nos. 95-16182and 96-16101, by that Office.

BACKGROUND OF THE INVENTION

Technical Field

The present invention relates to apparatus and a process for electrically grounding a cathode ray tube in a video monitor of a computer system, and more particularly, to a process and apparatus for endowing an electrical grounding apparatus with the capability for grounding a high voltage induced into a cathode ray tube by establishing an electrical shunt between the cathode ray tube, a mold frame, a guide bracket and a shield plate, without requiring a separate grounding device.

Background Art

Generally, a computer system is constructed with what may be essentially described as a system unit housing a central processing unit (i.e., a CPU), a keyboard connected to the central processing unit as an input device, and a video monitor such as a cathode ray tube (i.e., a CRT) indirectly driven by the central processing unit to provide a variable visual display and thereby enable a user to intelligently interact with the system unit. The video monitor is an interface between the system unit and a user, and should therefore, be harmless to the human body of a user. Thus, a video monitor is needed that is able to meet safety regulations.

Among other requirements for meeting such safety regulations, is the imperative of electrically grounding high voltages induced at a cathode ray tube of the video monitor because high voltage has the ability to inflict a mortal wound on a user. Various attempts to ground high voltages applied to a cathode ray tube have been reported in the art. Conventionally adopted techniques for grounding the high voltage of a cathode ray tube have included a grounded chassis frame attached to a section of a front cover of the monitor's housing. Two techinques are, among others, widely known in the art for establishing an electrical connection between a cathode ray tube and the frame of the monitor's chassis. One technique uses a grounding plate, and the other technique uses a grounding wire. In the first technique, during the manufacture of the monitor, a grounding plate is attached to and set upright on both sides of the from end of the frame of the monitor's chassis as an integral part of the assembly. The cathode ray tube is assembled with a bezel forming the front cover, and the frame of the chassis is installed at the lower portion of the from cover section. The grounding plate is arranged to contact the lower portion of the cathode ray tube, and because the ground plate is displaced somewhat, the ground plate establishes a constant electrical contact with the cathode ray tube. As a result, an electrical path is maintained between a conductive coating on the exterior surface of the cathode ray tube and the chassis. This allows an induced high voltage to flow via the grounding plate to the chassis. A ground wire is coupled to the chassis. I have noticed however, that in monitors using this first conventional technique for grounding high voltage by using a ground plate, deformation of grounding plate may sometimes inadvertently occur during the manufacturing process because the ground plate is prearranged to be attached to the frame of the chassis and is subject to excessive bending and other deformation as an incident of conveyance and handling during manufacture. This can, if severe enough, cause a permanent displacement of the distal ends of the ground plates during manufacturing, thereby preventing electrical connection with the electrically coated surface of the cathode ray tube, a grave risk of injury to a user. Also, because the ground plates are designed to be flexible, they are unable to bear the weight of the monitor. Careless idling of the ground plate over the long life span of the monitor can deform the ground plates and interrupt the electrical connection between the coated surface of the tube and the ground plates, thereby causing a danger to a user subsequent to the careless handling.

The second technique uses a bare ground wire draped closely between the four corners of the funnel portion of the cathode ray tube to make electrical contact with the electrically conductive exterior coating on the tube. A lead is typically connected between the ground wire and a terminal provided on the frame of the chassis so that a high voltage induced at a cathode ray tube will be grounded to an alternative current wall outlet via the frame of the chassis frame. I have found that with this technique however, any disconnection between the lead and the ground wire will create a risk of danger to the human body of a user. Moreover, there is some inconvenience and increase in per unit cost incurred by installing the ground wire during manufacture of the monitor; the inconvenience experienced by the assembly line workers adversely affect production quality.

SUMMARY OF THE INVENTION

Therefore, it is an object of the present invention to provide an improved process and apparatus for grounding high voltages induced at a cathode ray tube mounted in a video monitor.

It is another object to provide an assembly for grounding a high voltage induced at a cathode ray tube mounted in a video monitor without use of a separate grounding device.

It is still another object to provide a process and assembly for reliably grounding the exterior of a cathode ray tube with a minimum of effort during the manufacturing assembly of a video monitor.

These and other objects may be accomplished with a cathode ray tube having a plurality of ears at the respective corners of a metallic band peripherally surrounding the panel of the tube. A bezel for the monitor has a section containing several bosses accommodating fixed engagement with corresponding ones of the ears. A pair of grooves accommodates and guides the insertion of a portion of a molded time, and a time strap for is attached to the molded frame. The molded frame has a pair of ribs engaging a guide bracket, and a shield plate has a pair of conduction arms respectively provided with a tab interposed between the strap attached to the frame and the fibs. A conduction arm mounted on the shield plate may be bent at an angle of one hundred eighty degrees.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
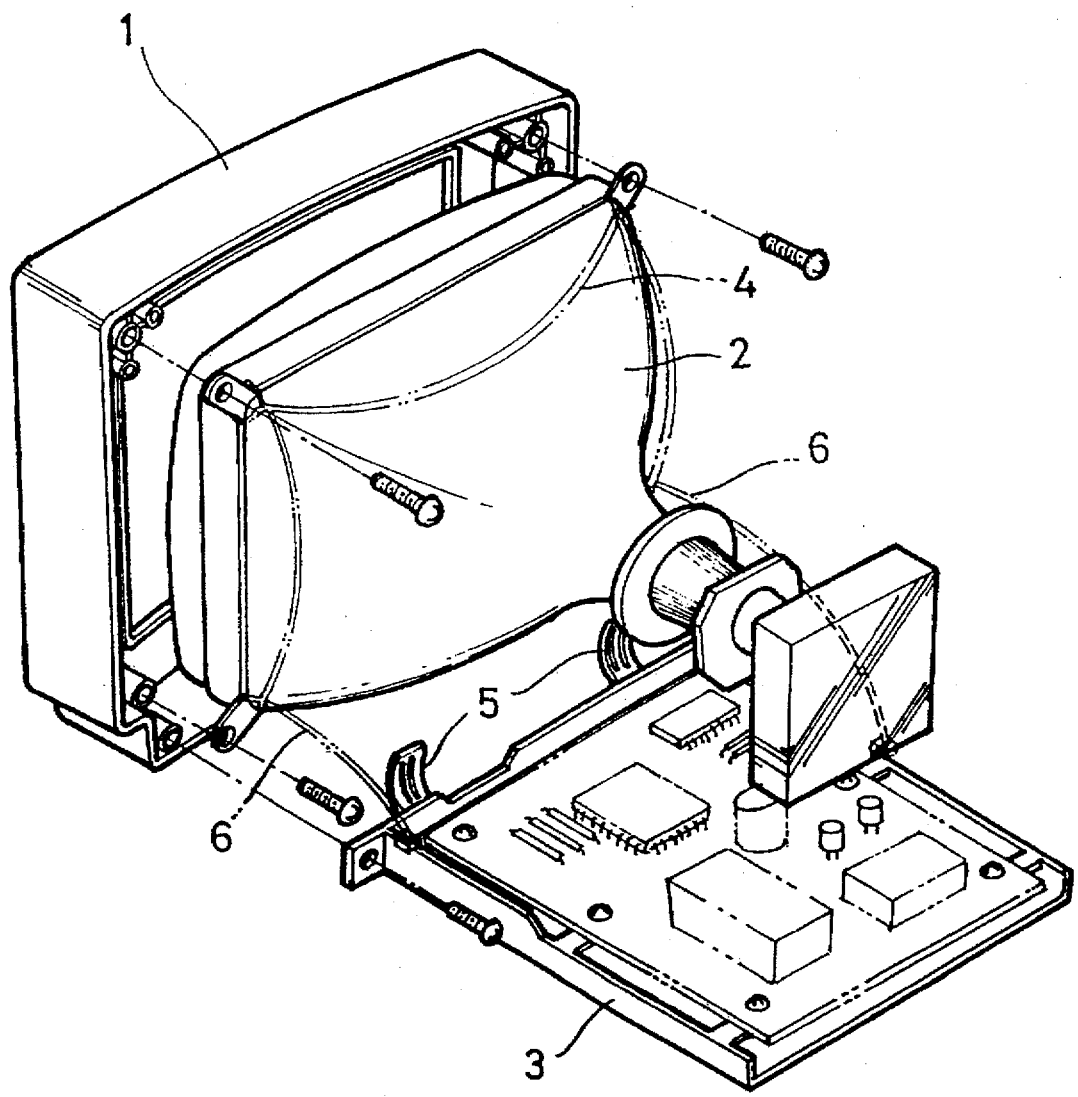
FIG. 1 is an exploded perspective view of a representation of a hypothetical typical video monitor, providing a composite illustration of conventional grounding devices often used in conjunction with cathode ray tubes.
Figure 2:
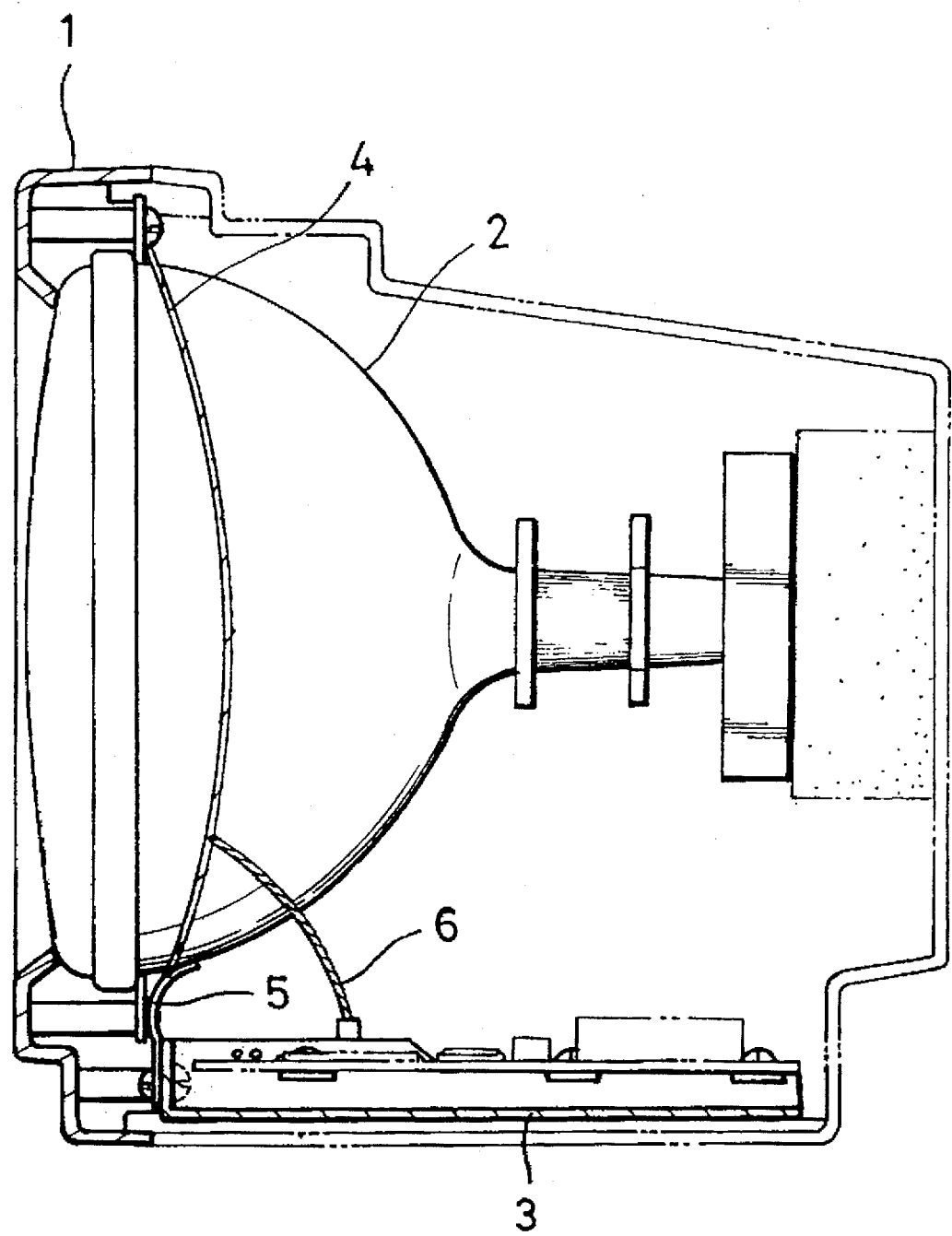
FIG. 2 is a side, partially cross-sectional elevation view of the assembled video monitor represented in FIG. 1.
Figure 3:
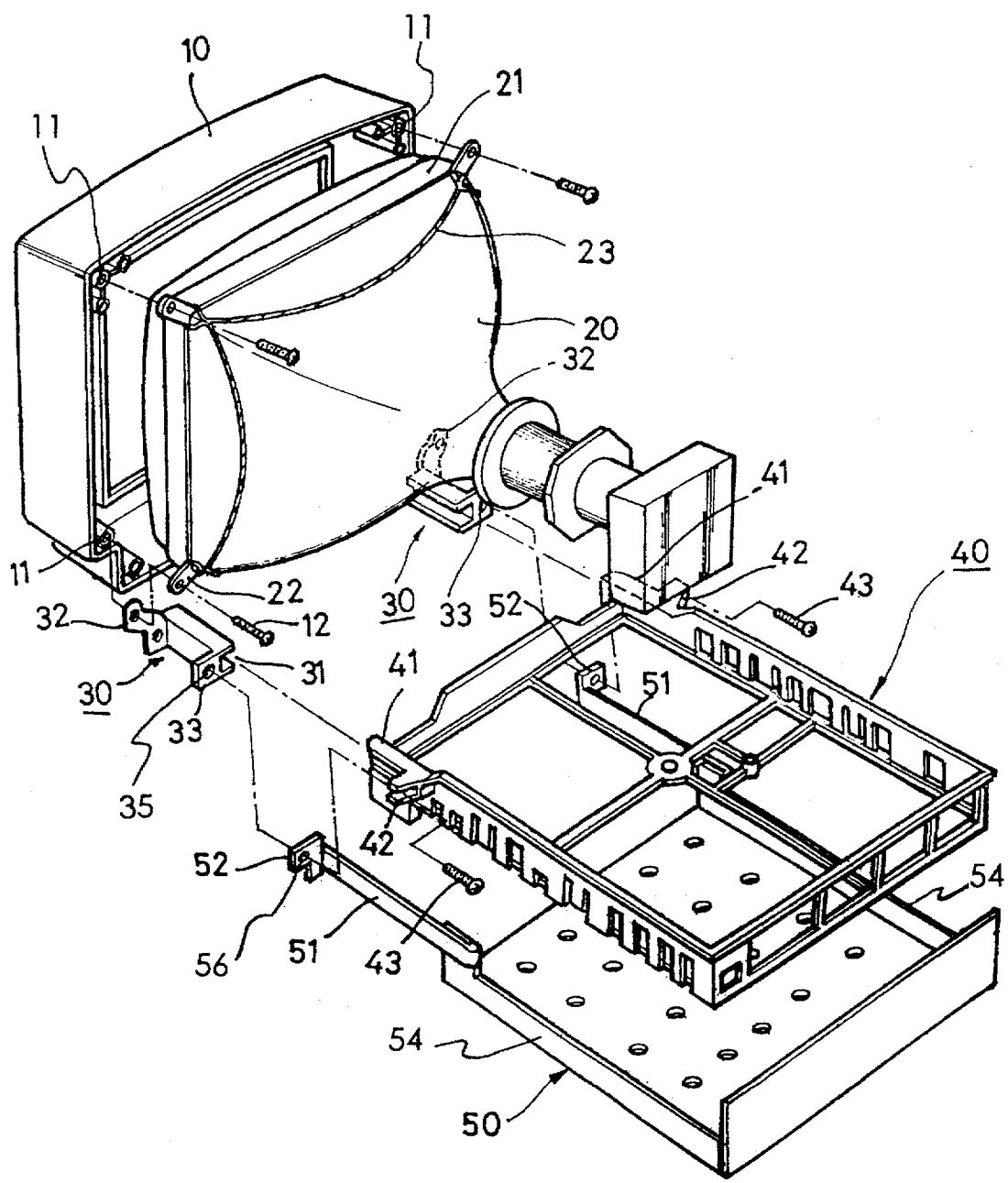
FIG. 3 is an exploded perspective view of a video monitor incorporating a grounding apparatus of one preferred embodiment constructed according to the principles of the present invention.
Figure 4:
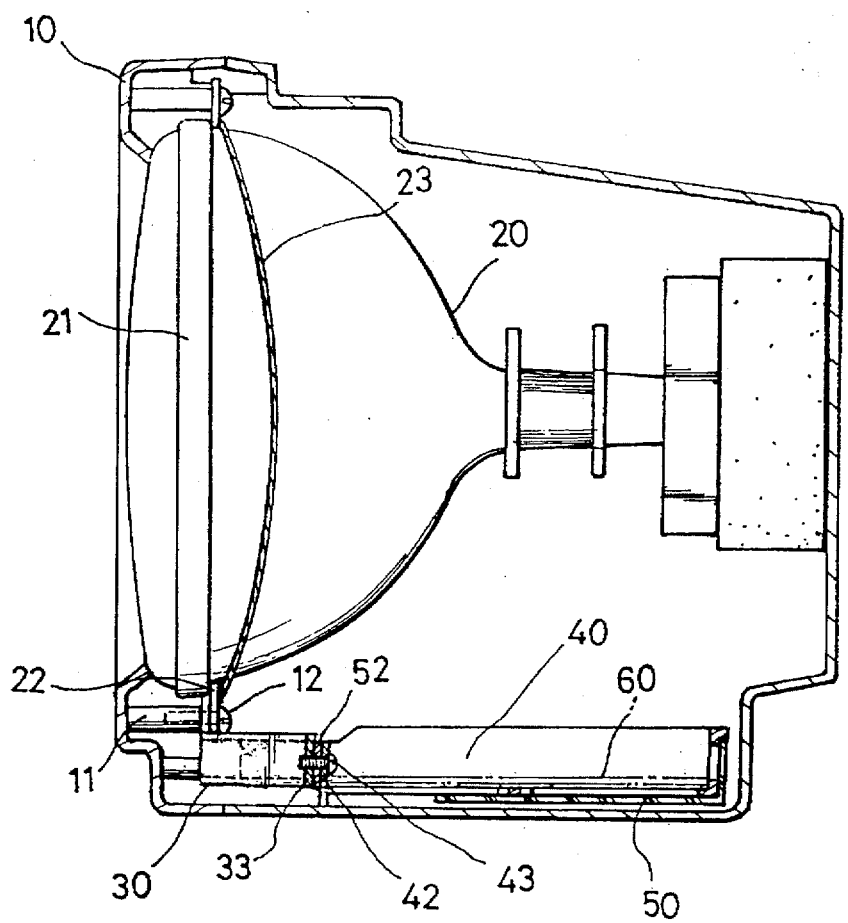
FIG. 4 is a side, partially cross-sectional elevational view of the assembled video monitor represented in FIG. 3.

Turning now to the drawings, FIGS. 1 and 2 illustrate hypothetical representations of typical conventionally adopted techniques often used in efforts to electrically ground high voltages applied to a cathode ray tube. According to the techniques embodied in a cathode ray tube grounding apparatus of one conventional type, high voltages induced at a cathode ray tube 2 are grounded to chassis 3 for the video monitor. A bezel 1 forms a front cover that is bolted to one end of chassis 3. Variations of the two methods illustrated by the composite views of FIGS. 1 and 2, are, among others, widely used in the art for establishing an electrical connection between a cathode ray tube and the frame of chassis 3. One technique uses ground plates 5, while the other technique uses a bare ground wire 4. FIG. 1 illustrates the technique using ground plates 5, illustrated by solid lines in FIG. 1. During the manufacturing process for video monitor, ground plates 5 are fixed to and set vertically upright at opposite sides of the from end of chassis 3 as an integral part of assembly. During the manufacturing process, cathode ray tube 2 is assembled with bezel 1 forming a from cover for the monitor. Bezel 1 has an opening through which the screen of cathode ray tube 2 may be viewed. Chassis 3 is attached to the lower portion of bezel 1. Ground plates 5 are arranged to electrcially contact an electrically conducting coating applied to the lower portion of cathode ray tube 2. When tube 2 is mounted upon chassis 3, plates 5 are displaced by the bulk of tube 2, and are forced backward; because plates 5 are relatively this and flexible, they retain a force of restoration and therefore are maintained under compression against the exterior of tube 2, this securing a tight electrical contact with the coating on the lower exterior of cathode ray tube 2. As a result, an electrical path is established between the conductive coating coated on the surface of tube 2 and chassis 3, thus allowing high voltages to flow via ground plates 5 to chassis 3, to which a ground wire of an alternative current wall outlet is connected. In this technique, deformation of one or both ground plates 5 may sometimes occur as the assembly travels through the manufacturing process because ground plates 5 are prearranged to be attached to a chassis frame and both these parts and the partial assembly is subject to inadvertent application of extraneous forces during conveyance and handling. Gound plates are set upright and simultaneously attached to chassis 3 in the process of manufacturing, and sometimes a permanent sag of one or both ground plates is it allowed to occur, thereby preventing a continuous, reliable electrical connection between the surface of cathode ray tube 2 and chassis 3. Moreover, because ground plates 5 are not arranged to support the mass of cathode ray tube 2, careless handling during the long lifespan of the video monitor may cause such an electrical discontiuity as to present some risk to a user.

The other conventional method of grounding a high voltage induced at a cathode ray tube is illustrated by the phantom lines in FIG. 1. Ground wire 4, is bare and uncovered, and is arranged closely to extend between four corners of the funnel portion of cathode ray tube 2 and provide an electrical connection with the conductive exterior coating. A lead 6 is connected between ground wire 4 and a terminal provided on chassis 3 so that a high voltage induced at cathode ray tube 2 is grounded to an alternating current wall outlet via chassis 3. Any discontinuity between lead 6 and ground wire 4 may will cause a danger to the human body of a user on work.

Turning now to FIGS. 3 through 6 collectively, a grounding apparatus for the cathode ray tube of a video monitor is illustrated. A rectangularly shaped bezel 10 forms a front cover for the housing (not shown) of the monitor. Cathode ray tube 20 fits within bezel 10. Guide bracket 30, molded frame 40 and shield 50 form the other major components of the assembled monitor.

Bezel 10 has boss 11 formed at each of its respective four corners so as to affix cathode ray tube 20 thereto. Cathode ray tube 10 is typically made of a glass-like flit, and is provided with metallic band 21 extending around and embracing the exterior periphery of tube 10 so as to enable tube 10 to be mounted within bezel 10. Metallic band 21 includes ears 22, protruding radially outwardly from each of the four centers of metallic band 21. Each of ears 22 are perforated to accommodate passage of a fastener such as a threaded screw 12, so that ears 22, and thus band 21, can be fastened to corresponding ones of bosses 11 on bezel 10.

Ground wire 23 is draped to be suspended between the four ears 22, and is disposed adjacent to the surface of the funnel portion of cathode ray tube 20, thereby allowing any high voltage induced upon the conductive coating of cathode ray tube 20 to flow from the coating, through ground wire 23 to ears 22.

Guide brackets 30 are formed by bending into concaved shapes to form C-shaped grooves 31. Brackets 30 are each provided with a from strap 32 forming front ends, and with frame straps 33 forming their rear ends. Front straps 32 are attached to opposite, lower bosses 11 by fasteners 12, so that guide brackets 30 are positioned on opposite sides of the lower portion of bezel 10, to with their corresponding grooves 31 arranged in parallel, to extend axially away from bezel 10.

Both of the front ends of opposite sides of frame 40 are provided with C-shaped guides 41 configured to matingly engage and be supported by groove 31. A pair of ribs 42 protruding outwardly from both side walls of frame 40, are arranged to align with and contact, and to be attached to corresponding ones of frame strap 33 by fasteners such as threaded screws 43. Frame 40 has a plurality of openings in its bottom wall, and has a configuration designed to accommodate the mounting of a main printed circuit board 60 thereon.

An electrostatic shield 50 is formed by a thin metal plate installed below frame 40, in order to shield against electromagnetic emissions. A pair of electrically conducting arms 54 form opposite side walls along shield 50.

Figure 5:
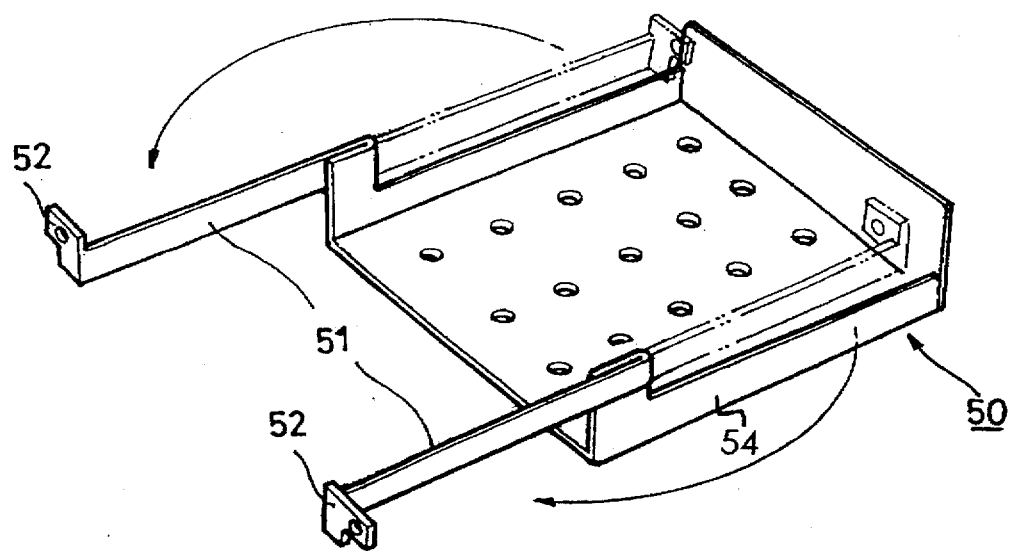
FIG. 5 is a perspective view of a shield incorporated into one preferred embodiment constructed according to the principles of the present invention.
Figure 6:
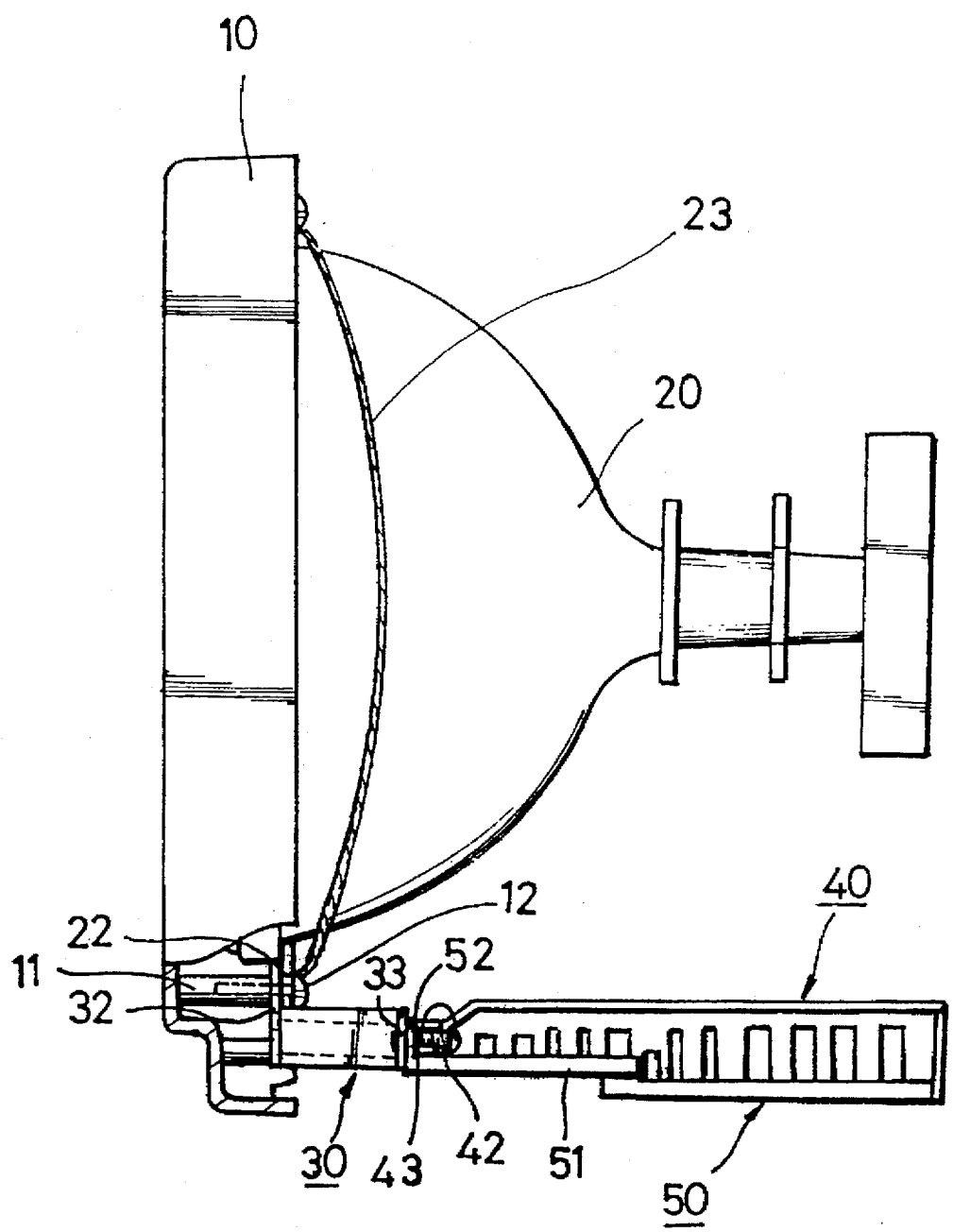
FIG. 6 is a side, partially cross-sectional elevational view of an assembled video monitor constructed according to the principles of the present invention.

Moving on to FIG. 5 and referring to an embodiment of shield 50 illustrated therein, conduction arms 51 are formed as integral parts of the corresponding sidewalls 54 of shield 50, and in the process of fabrication, is formed by bending sections of the upper edges of sidewalls 54 from the positions shown by phantom lines in FIG. 5, at angles of one hundred eighty degrees. Tabs 52 are integrally formed at the distal end portions of each of conduction arms 51.

A detailed process for assembing a video monitor is explained by referring again to FIGS. 4 through 6 collectively. Ears 22 protruding outwardly from each of the four corners of cathode ray tube 20 are aligned with corresponding bosses 11 formed in bezel 10 so as to enable assembly of cathode ray tube 20 with bezel 10 forming the front cover section of the completed video monitor. Guide brackets 30 are arranged by installation at both corners of the lower, inside portion of bezel 10. More specifically, front straps 32 of brackets 30 are inserted between and are arranged to align with bosses 11 and the distal ends of ears 22 so as to receive screws 12. Then, screws 12 are fastened, as necessary, to assemble bezel 10, cathode ray tube 20 and brackets 30 together.

Guide portion 41 formed on molded frame 40 is then matingly inserted into groove 31 into the C-shaped channel 31 provided by the upper and lower, inwardly directed flanges of guide bracket 30. As a result, opposite sides of the front end portion of frame 40 is supported by guide bracket 30, and frame straps 33 are aligned with corresponding ones of ribs 42. Screws 43 are inserted through apertures 56 in tabs 52, the voids provided pairs of ribs 42 to engage apertures 35 in straps 33, and fastened, as to the degree necessary, to attach frame straps 33 and fixing ribs 42 to tabs 52, following insertion and alignment of tabs 52 provided on conduction arms 51 between frame straps 33 and ribs 42. As was previously noted, conduction arms 51 are bent during manufacturing assembly at an angle of one hundred eighty degrees and are then assembled with frame straps 33 and ribs 42 by interposing tabs 52 therebetween so as to receive screws 43. By folding conduction arms 51 for assembly, a substantial quantity of raw material equavalent to the mass of the body of conduction arms 51, can be saved, thereby markedly reducing unit cost.

Turning now to the electrical grounding operation performed during the manufacturing of one embodiment of the present invention, high voltage induced across a cathode ray tube is applied to ears 22 via ground wire 23. Since ear 22 is arranged to electrically contact front straps 32 formed on guide brackets 30, the high voltage applied is in turn applied to frame straps 33 via front strap 33 and then to the body of guide bracket 30.

As a sequence, a high voltage so applied is supplied to shield plate 50 via conduction arms 51 due to the electrical connections between frame straps 33 and tabs 52, and in turn, is grounded via conduction through a ground wire of to an alternating current power cord connected to a wall outlet in a grounded circuit (not shown). Accordingly, the apparatus for gounding high voltages occuring on the exterior of the cathode ray tube according to the practice of one embodiment of the present invention is configured to ensure a continuous and reliable engagement between component assemblies of the video monitor by using fasteners such as electrically conducting, threaded screws, thereby establishing simultaneous multiple paths of electrical conduction therebetween. Consequently, such a problem as an electrical faulty connections due to a discontinuity between component assemblies of the monitor caused by, for example, a slight deformation or an error during manufacturing assembly, or a contraction owing to a long term hard or misuse of the monitor, or to inadvertent mishandling by the owner, is significantly reduced. In an embodiment constructed according to the principles of the present invention, a high voltage induced at a cathode ray tube is grounded without failure, thereby significantly reducing the risk that a video monitor containing a cathode ray tube will cause harm to the body of human being.

Additionally, grounding is ensured by using a metal plate to provide an electrostatic shield as a component part of the chassis beneath the cathode ray tube. The shield essentially inhibits electromagnetic emission below the molded frame having a plurality of openings for easy access to both sides of the main printed circuit board during in situ repair of the board, without the necessity of installing a temporary, separate grounding component.

Due to the structural characteristics of the folded configuration of the conduction arms, the size of plate forming the electrostatic shield be reduced to the smallest dimensions, thereby reducing the cost thereof. The disclosure in one embodiment of the present invention excludes separate process for assembling earth system due to the usage of existing assembly, thereby simplifying assembly and enhancing quality and product reliability, at a low cost.

While there have been illustrated and described what are considered to be embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A grounding apparatus for use with a video monitor, said grounding apparatus comprising:

front case section;

a cathode ray tube having at least a Cathode ray tube ear at any of respective four corners on a metallic band extending around the periphery thereof, said Cathode ray tube ear being fixed to said front case section by first screw and a grounding wire disposed to be suspended to said Cathode ray tube ear;

a guide bracket being fixedly assembled with said Cathode ray tube ear and said from case section;

a mold frame fastened to by second screw and supported by said guide bracket; and a shield plate having at least a conduction arm being fixedly assembled to said guide bracket by said second screw.

2. The grounding apparatus as claimed in claim 1, wherein a front fixing strap formed on said guide bracket is interposed between a boss formed in said front case section and said Cathode ray tube ear, whereby said screw is fastened to said boss through said front fixing strap.

3. The grounding apparatus as claimed in claim 1, wherein said guide bracket further comprises a groove into which a guide portion of said mold frame is inserted and a frame fixing strap to which a fixing rib of said mold frame is fixedly assembled by said second screw.

4. The grounding apparatus as claimed in claim 1, wherein a pair of said guide bracket arc individually assembled to both end of the lower portion of said front case section.

5. The grounding apparatus as claimed in claim 1, wherein said conduction arm includes a fixing tab at its free end portion, said fixing tab being fixedly assembled to said frame fixing strap by said second screw.

6. The grounding apparatus of claim 1, wherein said fixing tab of said shield plate is disposed to interpose between said frame fixing strap and said fixing rib, whereby said second screw is fastened to said frame fixing strap through said fixing tab.

7. The grounding apparatus as claimed in claim 1, wherein said conduction arm is folded at an angle of substantially ono hundred eighty degrees, enabling said fixing tab to contact with said frame fixing strap.

8. An assembly structure for grounding a high voltage induced across a cathode ray tube mounted in a video monitor said cathode ray robe having a metallic band extending around the periphery thereof, which metallic band being provided with a Cathode ray tube ear at its respective four corners for hanging a grounding wire for establishing an electrical conduction path, said video monitor having a front case section provided with a boss at both corners of the lower portion inside thereof, for receiving a screw coupling device, said assembly structure comprising:

a pair of guide bracket respectively, having a front fixing strap at its front end portion for engagement with said both and said lug, a groove for receiving a guide portion of a mold frame so as to support said mold frame and a frame fixing strap provided at the rear end portion thereof to align with a fixing rib of said mold frame; and a shield plate having a pair of folded conduction arm at its both front end portion, said conduction arm being provided with a fixing tab to interpose between said frame fixing strap and said fixing rib, for receiving a screw so as to secure an engagement with said frame fixing strap.

9. The grounding apparatus of claim 3, wherein said fixing tab of said shield plate is disposed to interpose between said frame fixing strap and said fixing rib, whereby said second screw is fastened to said frame fixing strap through said fixing tab.

10. The grounding apparatus of claim 5, wherein said fixing tab of said shield plate is disposed to interpose between said frame fixing strap and said fixing rib, whereby said second screw is fastened to said frame fixing strap through said fixing tab.

* * * * *